(12) United States Patent
Nakazawa et al.

(10) Patent No.: US 6,457,829 B1
(45) Date of Patent: Oct. 1, 2002

(54) PROJECTION DEVICE COMPRISING A CORRECTION LENS ARRANGED BETWEEN A PRISM OPTICAL SYSTEM AND AT LEAST ONE OF THREE OPTICAL MODULATION ELEMENTS

(75) Inventors: Kimiaki Nakazawa, Saitama; Kenzo Sado, Yuki, both of (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 65 days.

(21) Appl. No.: 09/644,554

(22) Filed: Aug. 24, 2000

(30) Foreign Application Priority Data

Aug. 31, 1999 (JP) ............................. 11-244976

(51) Int. Cl.⁷ ....................... G03B 21/00; G03B 21/20; G03B 21/14; G02B 13/22; G02B 3/00
(52) U.S. Cl. ........................... 353/31; 353/33; 353/102; 353/69; 359/663; 359/649
(58) Field of Search ........................... 353/102, 81, 31, 353/33, 22, 69; 359/663, 648, 649; 349/5, 7

(56) References Cited

U.S. PATENT DOCUMENTS 5,562,334 A * 10/1996 Wortel ....................... 353/69
6,137,635 A * 10/2000 Nakazawa ................ 359/621
6,273,568 B1 * 8/2001 Okuyama .................... 353/31
6,342,971 B1 * 1/2002 Hashizume et al. ......... 359/634

FOREIGN PATENT DOCUMENTS

JP      H9-33881        2/1997   ............. G02F/1/13
JP      2000-39584      2/2000   ........... G02B/27/18

* cited by examiner

Primary Examiner—Russell Adams
Assistant Examiner—Melissa J Koval
(74) Attorney, Agent, or Firm—Arnold International; Bruce Y. Arnold

(57) ABSTRACT

A transparent member having refractive power as a result of curved surface thereon is used in one or more light paths of a three-color projection device in order to correct for the lateral color aberration of the projection lens. The transparent member is positioned between one or more optical modulation element(s) and the beam combining prism of a prism optical system, or alternatively, is on or affixed to the beam combining prism surface. When correcting an image that is enlarged by the projection lens, the curved surface of the transparent member should be convex and positioned on the side of the transparent member nearest the display panels. The focal length of a correction lens that optimally corrects the lateral color of the projection lens depends on the maximum image height at the image input display panel, the lateral color aberration generated by the projection lens, and the air conversion length from the image input display panel to the on axis position of the curved surface.

10 Claims, 5 Drawing Sheets

PROJECTION DEVICE COMPRISING A CORRECTION LENS ARRANGED BETWEEN A PRISM OPTICAL SYSTEM AND AT LEAST ONE OF THREE OPTICAL MODULATION ELEMENTS

CROSS REFERENCE TO RELATED APPLICATION

This application is related in subject matter to allowed U.S. application Ser. No. 09/356,552 filed Jul. 19, 1999 now U.S. Pat. No. 6,137,635, the disclosure of which is hereby incorporated by reference.

BACKGROUND OF THE INVENTION

A liquid crystal projection device which modulates the illumination light with prescribed picture signals by using liquid crystal panels and which enlarges the picture information by projecting this modulated light onto a screen is known (see, for example, Japanese Laid Open Patent Application H9-33881).

In recent years, in order to accommodate applications for various presentations, a color liquid crystal projector having projection lenses with different focal lengths that can be interchanged has received developmental attention. Further, the image quality of projection lenses has been rapidly approaching that of a high definition display, as the formats have changed from VGA, to SVGA, to XGA, and to SXGA.

In the prior art liquid crystal panels having a large pixel size, even if the lateral color aberration of the projection lens was somewhat large, there was little concern due to there being no noticeable affect on the displayed image. However, as described above, concurrent with the reduction of pixel size for liquid crystal panels in recent years, the affect of lateral color aberrations on the quality of the image produced by the projection lens must now be considered. In other words, in a color liquid crystal projector, each color-component light beam (e.g., R, G and B) is radiated from different lateral directions in the dichroic cross-prism optical system, respectively; and the light beams are projected toward the projection lens after being combined by a cross-prism into a single beam of light. Because the wavelength of each color light beam is different, different magnifications of the image occur due to the lateral color aberration of the projection lens. This results in color shifts on the screen, resulting in colored light intended for one pixel area being projected to a different pixel area. Devising an improved projection lens having less lateral color aberration would result in preventing these color shifts to some effect. However, such an approach would also be costly.

Meanwhile, in order to preserve the illumination intensity on the screen, technology which reduces vignetting by a liquid crystal display, as a result of the liquid crystal display incorporating micro lenses, is known. For a projection lens, not only is high-definition necessary, but also a large aperture is required. However, if the projection lens has a large aperture, the lens diameter becomes larger, and it becomes necessary to correct for the greater chromatic aberration that results from the larger aperture. This also increases the cost of the projection lens. When composing each color-component light beam by using a so-called Philips prism, similar problems are noted. Of course, various types of optical modulation elements may be used for the projection device. For example, transmission or reflective liquid crystal panels, as well as DMD's (digital micro-mirror devices) are known which may be used to modulate a light beam with image information.

BRIEF SUMMARY OF THE INVENTION

This invention corrects for the change in magnification of an enlarging or reducing projection lens as the wavelength of light in the image varies, at lower cost than in the prior art.

The object of the invention is to provide a projection device which can easily correct for the lateral color aberration of a projection lens, by using a correction surface in the light path(s) before the projection lens. The present invention enables the correction to be accomplished at lower cost than the cost of an achromatic projection lens. Further, the invention can be combined with the invention disclosed in allowed U.S. application Ser. No. 09/356,552 now U.S. Pat. No. 6,137,635 so as to enable both the axial chromatic aberration and the lateral color of a projection lens to be corrected at low cost.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

The present invention is an improvement to a projection device having three optical modulation elements for modulating respective color-component beams (e.g., red, green and blue) with image information for that color component according to an input signal, a prism optical system that combines the three component beams transmitted from the optical modulation elements into a single beam, and a projection lens which projects incident, nearly telecentric, light received from a light source via the prism optical system onto a screen as an enlarged image. The improvement is employing a transparent member, positioned in the light path between one or more of the optical modulation elements and the prism optical system. A characteristic feature of the invention is that the transparent member includes a curved surface specially designed to correct for the lateral color of the projection lens.

The prism optical system may include a dichroic cross-prism. It is desirable that the above-mentioned curved surface be a lens surface (i.e., have refractive power). Further, it is also desirable that the side opposite the curved lens surface be planar. In this manner, the transparent member may comprise a lens that is made of plastic and that is affixed to a plane-parallel plate.

An alternative construction of the present invention is, instead of using a separate transparent member having a curved surface to correct for lateral color of the projection lens as above, to make one or more surfaces of the prism optical system that face the optical modulation elements curved so as to have a refractive power that corrects the lateral color generated by the projection lens.

Another alternative construction of the present invention is to affix a plano-convex lens made of plastic onto a surface of a prism in the prism optical system. In this case, the curved surface of the lens, which has a specified refractive power which corrects for the lateral color of the projection lens, should be on the side of the lens nearest the projection screen.

Two embodiments of the projection device according to the present invention will now be discussed in detail with reference to the drawings.

Embodiment 1

Figure 1:
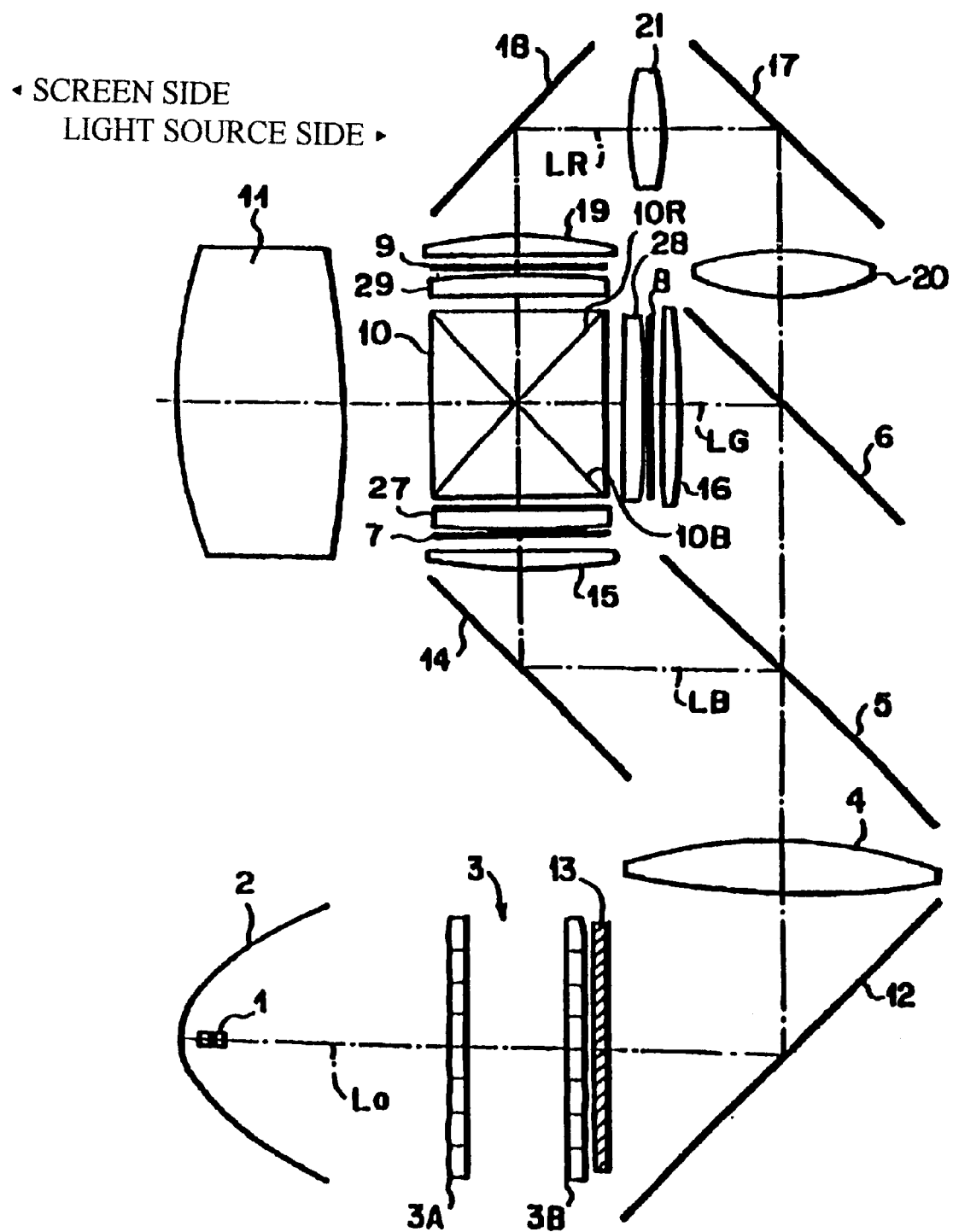
FIG. 1 shows the construction of a liquid crystal projection device according to a first embodiment of the invention.

FIG. 1 shows a liquid crystal projection device according to a first embodiment of the invention. This liquid crystal projection device is equipped with: an illuminator 1 which projects incandescent light; a reflector 2 which is formed of a parabolic mirror so as to reflect the incandescent light from the illuminator 1; an integrator 3 which makes the projected light more even than it would otherwise be; two dichroic mirrors 5, 6 which divide the converged incandescent light at the condenser lens 4 into three color-component light beams; three liquid crystal panels 7, 8, 9 which each modulate a respective color-component light beam divided by the first dichroic mirror 5 and the second dichroic mirror 6 according to prescribed picture information; a three-color combining prism 10, which combines the light beams modulated by each liquid crystal panel 7, 8 and 9; and a projection lens 11, which images the combined light beam onto a screen. The liquid crystal panels 7, 8 and 9 are of the transmission-type; however, these panels may instead be of the reflection-type.

As shown in FIG. 1, a mirror 12 which reflects the output light from the integrator 3 and guides it to the condenser lens 4, is arranged along the light path between the integrator 3 and the condenser lens 4.

The reflector 2 may be formed of a parabolic mirror with its focus positioned at the light source of the illuminator 1. The reflector 2 forms a beam of light that transits in the direction of the optical axis Lo.

The light integrator 3 is equipped with a first lenticular lens array 3A and a second lenticular lens array 3B. The first lenticular lens array 3A functions to divide the light from the illuminator 1 into multiple sub-beams, which correspond in number to the number of elements in the lenticular lens array 3A. The second lenticular lens array 3B superimposes each sub-beam from the first lenticular lens array 3A onto the liquid crystal panels 7, 8 and 9. In this way, the illumination at each of the liquid crystal panels 7, 8 and 9 is made more even as compared with the light which would be incident if the light integrator 3 were removed from the light path. A prior art polarization converter 13 may be positioned in the light path following the second lenticular lens array 3B in order to form, with high efficiency, linearly polarized light having a single, uniform direction of polarization. As the polarization converter 13 is not the subject of the present invention, further explanation of its construction and operation will be omitted.

There are numerous arrangements in which a multicolor beam of light may be separated into three color-component beams of light. In this embodiment, for example, the color components are separated as follows. The first dichroic mirror 5 divides the incident light into a blue component beam LB and a remaining beam having both green and red components. The second dichroic mirror 6 then divides the remaining beam into a green component beam LG and a red component beam LR.

Each divided color-component beam is then projected onto a respective liquid crystal panel 7, 8 or 9, respectively, which modulates the respective color-component beam with image information for that color component. As shown in FIG. 1, in the light path of the blue component LB there is positioned a first mirror 14 which reflects the blue component LB toward the first liquid crystal panel 7. At this panel the blue component of the composite image to be displayed is input to the first liquid crystal panel 7. A field lens 15 is arranged on this light path to collimate the light that is reflected by the first mirror 14. The blue component light beam LB is then incident as collimated light onto the first liquid crystal panel 7.

Also, a field lens 16 is arranged on the light path of the green component LG. The field lens 16 collimates the green component light beam LG before it is incident onto the second liquid crystal panel 8. At this panel the green component of the composite image to be displayed is input to the second liquid crystal panel 8. Similarly, on the light path of the red component light beam LR, field lenses 19 and 20 are positioned to cause the red component light beam to be collimated before being projected onto the third liquid crystal panel 9. Because the light path length from mirror 5 to the three-color combining prism 10 for the red component beam LR is longer than for the green component beam LG or the blue component beam LB, a relay lens 21 is arranged between the second mirror 17 and the third mirror 18. Using this relay lens 21, the light source is made to appear to be the same distance from the color combining prism 10 for all three color-component beams.

The three-color combining prism 10 is a cross-dichroic prism. This prism has a dichroic surface 10B which reflects the blue component light beam LB, and a dichroic surface 10R which reflects the red component light beam LR.

In prior art liquid crystal panels that have a large pixel size, even if the lateral color aberration of the projection lens is somewhat large, there is little concern. In recent years, however, liquid crystal panels have been rapidly advancing to higher definitions. For example, the SXGA-type display is now being used. Concurrent with the reduction of pixel size caused by this trend to higher definition displays, the deleterious effect caused by lateral color aberration generated by the projection lens must be recognized.

Notably, where a projector uses projection lenses of different focal lengths to display different formats, a simplified correction technique for correcting the lateral color of the projection lenses may be separately adopted.

Figure 4:
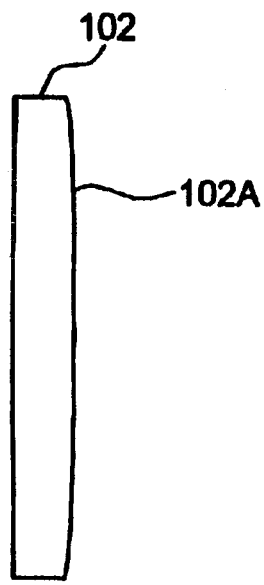
FIG. 4 is an enlarged view of a correction lens according to a first design and that is used to compensate for the lateral color of a projection lens.

As shown in FIG. 4, a lens 102 having a convex surface 102A that corrects for lateral color of the projection lens 11 may be arranged between the three-color combining prism 10 and each liquid crystal panel 7, 8 and 9. In other words, these lenses may be designed to correct for the difference in magnification of the projection lens depending on the wavelength of incident light. To correct for the lateral color generated in a projection lens that enlarges the image, the convex surface 102A of the lens 102 must be on the side nearest the liquid crystal panels 7, 8 and 9. Preferably, the surface of the lens 102 nearest the three-color combining prism 10 is planar.

The proper focal length F of a correction lens which optimally corrects for the lateral color of the projection lens is given by Equation (1) below $$F = D \times H / \delta \quad \text{Equation (1)}$$

where

- D is the air conversion length from each liquid crystal panel 7, 8, or 9 to the on-axis position of the correction surface;
- δ is the lateral color aberration generated by the projection lens; and
- H is the maximum image height at the image before projection.

When correcting for a projection image that is enlarged in size by the projection lens, F is positive. When correcting for a projection image that is reduced in size by the projection lens, F is negative. Where one side of the correction lens is planar, the optimum radius of curvature R of the correction lens is given by Equation (2) below:

$$R = (N-1) \times F \quad \text{Equation (2)}$$

where

- N is the index of refraction of the correction lens, and
- F is as defined above.

As shown by Equation (2), as F increases, the radius of curvature R of the correction lens increases; however, this causes the curved surface of the correction lens to approach that of a planar surface. However, when the curved surface of the lens approaches that of a planar surface, the process associated with lateral color correction by the surface becomes difficult. Therefore, according to the Equation (1), it is desirable that F be small. Thus, one should reduce the value of D as much as possible. Hence, the correction surface should be as near to the liquid crystal display as is practical.

Specifically, for example, when the lateral color aberration δ is 0.01 mm, the maximum image height H at the liquid crystal panels 7, 8 and 9 is 24 mm, the air conversion length D from each liquid crystal panel 7, 8 and 9 to the on-axis position of the correction surface of the lens is 5 mm, and the index of refraction N of the transparent plate is 1.5, then:

$$F = (5 \times 24)/0.01 = 12000$$

and $$R = (1.5-1) \times 12000 = 6000.$$

Therefore, when correcting for an enlargement of the projection image in the above-described case, a convex surface having a radius of curvature R equal to 6000 mm that is positioned 5 mm from each liquid crystal panel 7, 8 and 9 in the direction of the three-color combining prism 10 is optimum. When correcting for a reduction of the projection image in the above-described case, a concave surface having a radius of curvature R equal to 6000 mm that is positioned 5 mm from each liquid crystal panel 7, 8 and 9 in the direction of the three-color combining prism 10 is optimum.

Figure 2:
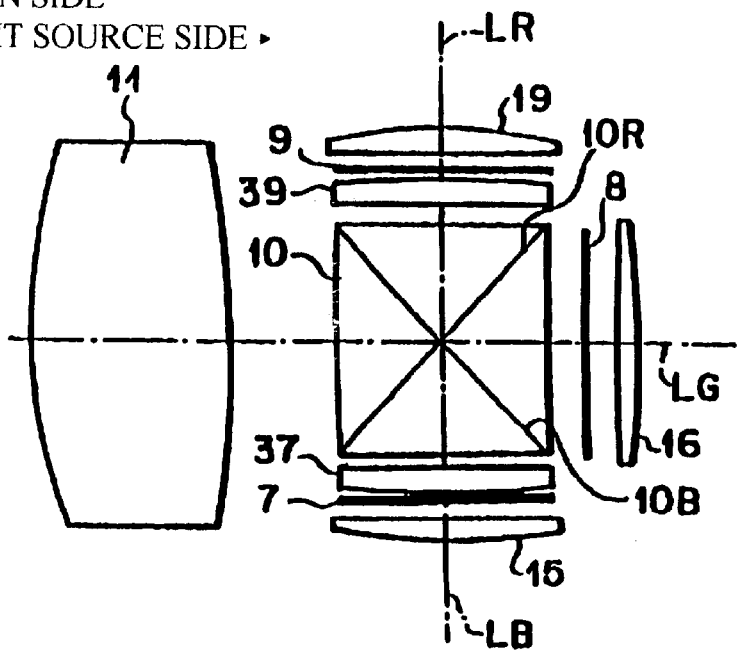
FIG. 2 shows an example of a modification to the projection device shown in FIG. 1.
Figure 3:
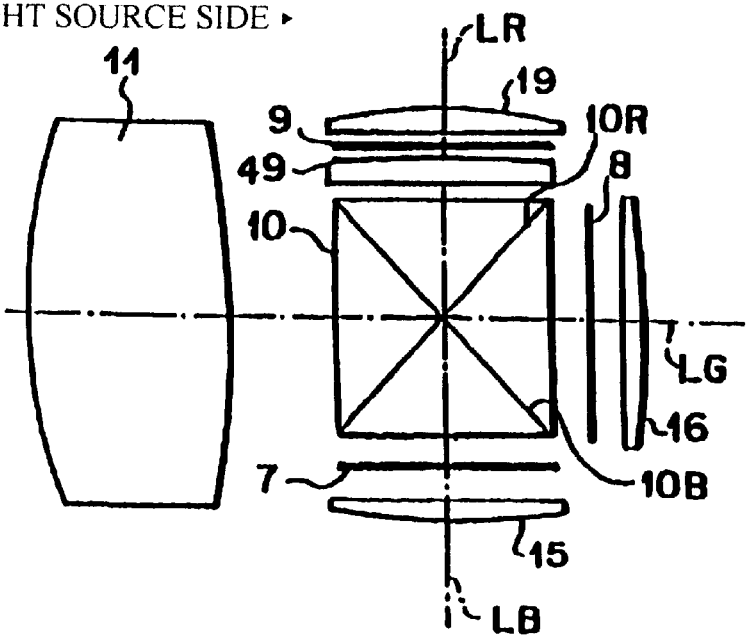
FIG. 3 shows another example of a modification to the projection device shown in FIG. 1.

In the above-mentioned embodiment, a respective lens (27, 28 or 29) for lateral color correction is inserted into each color-component beam. However, as shown in FIGS. 2 and 3, respective lenses 37, 39 for lateral color correction can be inserted in just two of the color-component beams (such as the red and blue light beams, illustrated in FIG. 2), or in only a single color-component beam, such as lens 49 (as illustrated in FIG. 3). Thus, the lateral color due to the projection lens can selectively be corrected only where the lateral color generated by the projection lens has a noticeable affect on the projected image. Further, when the correction lens for correcting lateral color generated by the projection lens is inserted into only a single color-component beam, it is most effective to correct the red component beam, since this color-component beam will contain the greatest amount of lateral color aberration produced by the projection lens.

Embodiment 2

Figure 8:
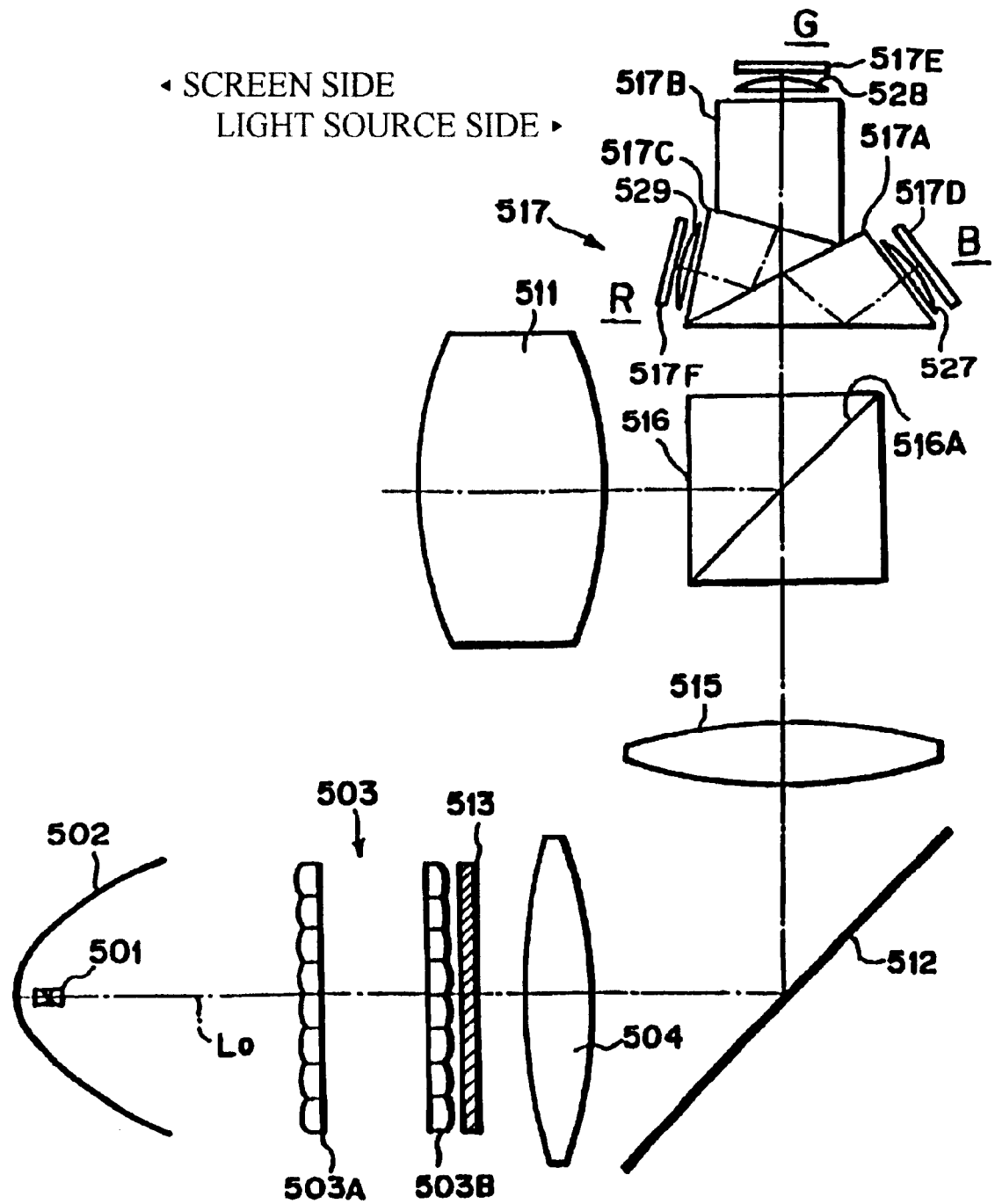
FIG. 8 shows the construction of a liquid crystal projection device according to a second embodiment of the invention.

FIG. 8 shows a liquid crystal projection device according to a second embodiment of the invention. This liquid crystal projection device employs reflection-type liquid crystal panels 517D, 517E, and 517F rather than transmission-type liquid crystal panels as in the first embodiment. Further, instead of using a cross-prism 10 (FIG. 1) a PBS prism 516 and Phillips prism 517 are used. Light modulated and combined into a single beam by the reflection-type liquid crystal panels and associated prisms 517A, 517B, and 517C is directed to PBS prism 516 where it is reflected to projection lens 511, and then projected as a desired full-color image onto a screen (not illustrated).

The liquid crystal projection device of the second embodiment is very similar in construction with that of the first embodiment. Thus, only a brief description of its components will be given. More specifically, the liquid crystal projection device is equipped with an illuminator 501, a reflector 502 which may be formed of a parabolic mirror so as to reflect incandescent light from the illuminator 501, an integrator 503, and a condenser lens 504. A reflection mirror 512 reflects the light incident thereon from the condenser lens 504 via a field lens 515.

As in the first embodiment, a prior art polarization converter 513 may be positioned in the light path prior to the light being incident onto reflection mirror 512. The light reflected from the reflection mirror 512 passes to the PBS 516 via field lens 515. Philips prism 517 divides the light components R, G and B using the prism blocks 517A, 517B and 517C, respectively, and it irradiates each color light to the reflection-type liquid crystal panels 517D, 517E and 517F (each formed of nematic liquid crystal material), which are installed opposed to the output face of each prism block 517A, 517B, 517C. After each color-component beam is optically modulated by the prescribed image signals for R, G and B on each reflection-type liquid crystal panels 517D, 517E, 517F, it is re-radiated to the Philips prism 517. Then, the light beam components are combined and projected from the Philips prism 517 along a path opposite to the direction the light entered the Philips prism 517.

As is well known, upon a 180 degree reflection from a surface, the polarization state of P-polarized light is automatically converted to S-polarized light, and vice-versa, simply as a result of the direction of propagation of the light being reversed. Therefore, the polarized light with image information which is output from the Philips prism 517 is reflected by polarization division face 516A of the PBS prism 516 toward the projection lens 511. This projection lens 511 projects the combined light containing image information onto a screen (not illustrated).

In this second embodiment, lenses 527, 528 and 529 are arranged between each prism block 517A, 517B, 517C and the corresponding reflection-type liquid crystal panel 517D, 517E, 517F, respectively, for correction of lateral color to be generated in the projection lens 511. The construction/function of these lenses 527, 528 and 529 for correction of lateral color is similar to that described above for the first embodiment of the invention, so a detailed explanation at this point is unnecessary and will be omitted. However, in the case of this embodiment, the light beams pass through the lenses twice, so the refractive power of each lens needs to be only half that described previously. Thus the radius of curvature for these lenses will be double that described earlier for the same values of the parameters D, H, δ, N.

Further, instead of using reflection-type liquid crystal panels 517D, 517E, 517F, one may use digital micro-mirror devices (DMD's). And, just as discussed above for the first embodiment, it is possible to selectively correct fewer than all color-component beams for lateral color of the projection lens. In the event the display panels used to modulate the light rotate the linear polarization direction of the light that is output (e.g., as does a twisted, nematic LCD display), a half-wave retardation may be used, as is well known in the art, to convert P-polarized light to S S-polarized light, or vice-versa, so that the polarizing beam splitter 516 directs the light in the manner illustrated in FIG. 8.

The projection device of this invention is not limited to the above-mentioned embodiments, but can be implemented for various other modes, as desired. For example, in the above-mentioned embodiments, a plano-convex lens or a plano-concave lens is used as the transparent member in order to correct for lateral color of the projection lens. However, it is also possible to use a biconvex, biconcave or meniscus lens. Although a spherical surface which corrects for the lateral color of the projection lens is taught above, a non-spherical surface, particularly a hybrid non-spherical surface that corrects for additional aberrations, may instead be used.

Figure 5:
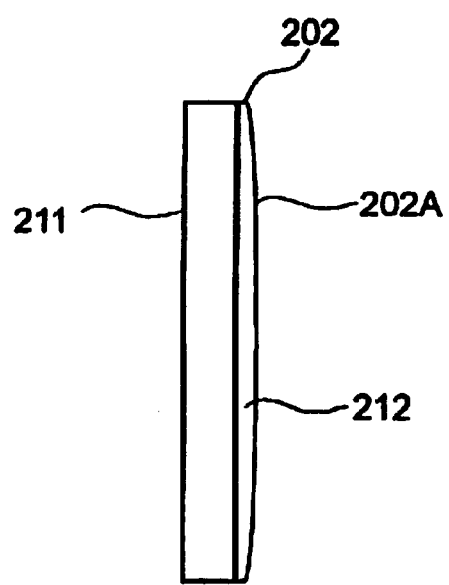
FIG. 5 shows an example of a modification to the correction lens shown in FIG. 4.

As shown in FIG. 5, instead of using the above-described lenses for correction of lateral color, a plastic lens 212 having a curved surface 202A may be affixed onto one surface of the parallel-plane glass plate 211. It is preferable to arrange this lens between one or more liquid crystal panel 517D, 517E, or 517F and the Philips prism 517, and to arrange the above-mentioned curved surface 202A on the side nearest the liquid crystal panel. Further, the plastic lens 212 can be formed by molding, making this an easier and less expensive alternative than using lens 102 having a curved surface 102A. Of course, it is also possible to simultaneously correct for axial chromatic aberration generated by the projection lens by employing a plane-parallel glass plate 211 having a specified thickness, as taught in the above-mentioned related application.

As explained above, with the projection device of this invention, arranging a transparent plate with a curved surface between one or more optical modulation elements and the beam combining prism in order to correct for the lateral color aberration of the projection lens, or forming a curved surface in the light path on the face of the combining prism in order to correct for the lateral color aberration, results in removing the lateral color aberration of the projection lens. In the case of using the above-mentioned transparent plate, when replacing the projection lens with one of a different focal length, the transparent plate should also be replaced with one having a curvature to correct for the lateral color of the new projection lens. Compared with the case of using an achromatic projection lens, the present invention can effectively correct for lateral color of the projection lens at low cost.

Figure 6:
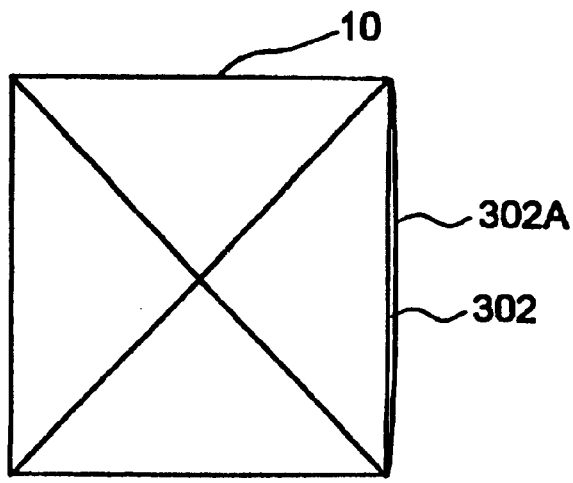
FIG. 6 shows yet another example of a modification to the correction lens shown in FIG. 4.
Figure 7:
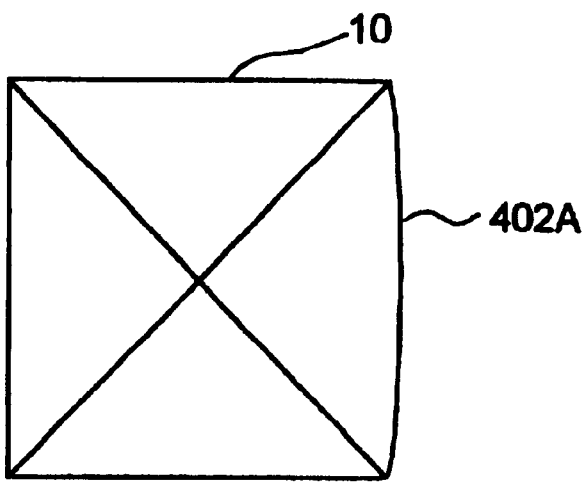
FIG. 7 shows an additional example of a modification to the correction lens shown in FIG. 4.

The invention being thus described, it will be obvious that the same may be varied in many ways. For example, instead of using the lenses for correction of lateral color, a plastic lens 302 which has a curved surface 302A, as shown in FIG. 6, and is placed in the light path either at one or more faces of the three-color combining prism 10, or of the Philips prism 517, can be used with a similar effect. Or, as shown in FIG. 7, a curved surface 402A that is positioned in the light path (either on one or more surfaces of the three-color combining prism 10, or the Philips prism 517) may be used. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. In a projection device having three optical modulation elements that modulate three respective color-component light beams with image information corresponding to said respective color components, a prism optical system that combines each color-component light beam from the optical modulation elements into a single beam; and a projection lens that receives substantially telecentric light from said prism and projects said light as a magnified image, the improvement of: providing a correction lens that is arranged between the prism optical system and at least one of the optical modulation elements, said correction lens including a curved surface that is convex on the side of the correction lens nearest the optical modulation element, said correction lens correcting for lateral color aberration of the projection lens and having a focal length F defined by the following equation $$F = D \times H / \delta$$

where

D is the air conversion length from the liquid crystal panel to the on-axis position of said curved surface, H is the maximum image height at the image before projection, and $\delta$ is the lateral color aberration generated by the projection lens.

2. The improvement of claim 1, wherein the prism optical system includes a dichroic cross-prism.

3. The improvement of claim 1, wherein the transparent member is a lens.

4. The improvement of claim 2, wherein the transparent member is a lens.

5. The improvement of claim 3, wherein one of two opposed surfaces of the lens is planar.

6. The improvement of claim 1, wherein the transparent member is formed of a plastic lens affixed to a parallel-plane plate.

7. The improvement of claim 2, wherein the transparent member is formed of a plastic lens affixed to a parallel-plane plate.

8. In a projection device having three optical modulation elements that modulate three respective color-component light beams with image information corresponding to said respective color components, a prism optical system that composes each color-component light beam from said optical modulation elements; and a projection lens that receives substantially telecentric light from said prism and projects said light as a magnified image, the improvement of: providing a transparent member formed of a plano-convex correction lens with its convex surface on the side nearest an optical modulation element for a given color component in order to correct for lateral color aberration of the projection lens, said convex surface having a radius of curvature R defined by the following equation $$R = (N-1) \times F$$

where

N is the index of refraction of the transparent member, and

F is the focal length of the correction lens.

9. The improvement of claim 8, wherein the prism optical system includes a dichroic cross-prism.

10. The improvement of claim 8, wherein the curved surface is that of a plastic lens which may be affixed to a surface of the prism optical system.

* * * * *

UNITED STATES PATENT AND TRADEMARK OFFICE
CERTIFICATE OF CORRECTION

PATENT NO.    : 6,457,829 B1
DATED         : October 1, 2002
INVENTOR(S)   : Nakazawa et al.

It is certified that error appears in the above-identified patent and that said Letters Patent is hereby corrected as shown below:

Title page,
Item [57], ABSTRACT,
Lines 1-2, change "member…is" to -- member, having refractive power due to a surface thereof being curved, is --; and Column 7,
Line 9, change "S S-polarized" to -- S-polarized --.

Signed and Sealed this

Fourth Day of March, 2003

JAMES E. ROGAN
*Director of the United States Patent and Trademark Office*